Figure 1:
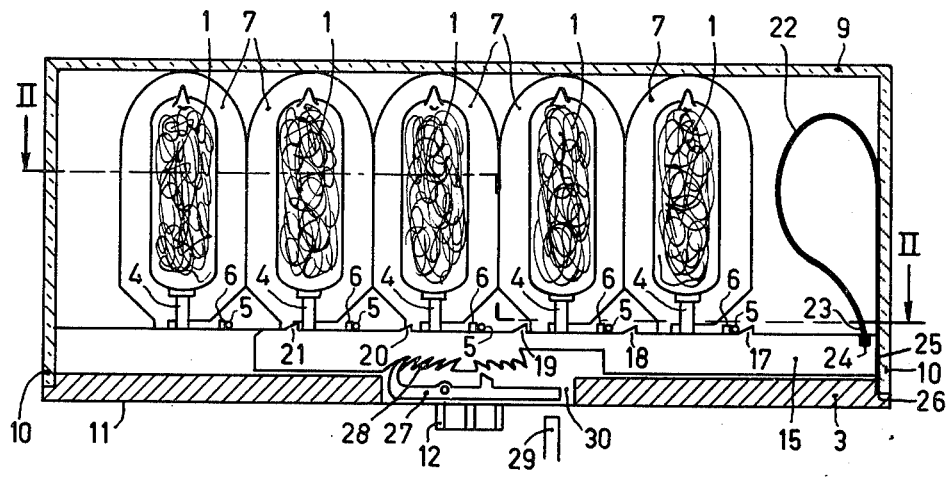

United States Patent [19]

Heeman et al.

[11] 3,980,421

[45] Sept. 14, 1976

[54] FLASH LAMP UNIT

[75] Inventors: Andreas Maria Heeman; Piet Jan Maria Steeghs, both of Eindhoven, Netherlands

[73] Assignee: U.S. Philips Corporation, New York, N.Y.

[22] Filed: Sept. 13, 1974

[21] Appl. No.: 505,633

[30] Foreign Application Priority Data

Sept. 28, 1973 Netherlands .................. 7313364

[52] U.S. Cl. ............................ 431/93; 240/1.3
[51] Int. Cl.² .................. F21K 5/02; G03B 15/02
[58] Field of Search ................... 431/92, 93, 95; 240/1.3; 354/126, 142, 148

[56] References Cited
UNITED STATES PATENTS 3,812,339    5/1974    Broadt .................... 240/1.3

Primary Examiner—Fred L. Braun
Attorney, Agent, or Firm—Frank R. Trifari

[57] ABSTRACT

A flash lamp unit having at least one row of flash lamps which are arranged on a common elongate support and which can be fired by a stroke against a lamp portion, which flash lamp unit comprises a number of striker springs which are locked in the pre-energized condition and which can be unlocked by ramps on a body which is movable step-wise in the longitudinal direction of the support, the force necessary for the movement being supplied by a transport spring present in the unit or by at least one of the striker springs. The step-wise movement of the body is preferably enabled by an escapement which cooperates with teeth occurring on the body. The ramps on the body cooperate with the springs to sequentially release the springs.

3 Claims, 7 Drawing Figures

U.S. Patent   Sept. 14, 1976   Sheet 1 of 3   3,980,421

FLASH LAMP UNIT

The invention relates to a flash lamp unit having a number of combustion flash lamps arranged in at least one row and mounted on a common elongate support and which can be fired by a stroke, which unit comprises a number of striker springs which are locked in the energized condition and which are each designed to strike against a part of a flash lamp after unlocking, said flash lamp unit furthermore comprising an alongate body which is movable in the longitudinal direction of the support and which has projections arranged at such a mutual distance that as a result of a step-wise movement of the body each time one striker spring is unlocked, holding means being furthermore present to lock the body in an assumed position. Such a flash lamp unit is known from the U.S. Pat. No. 3,735,111.

Unlocking of each of the striker springs in said known flash lamp unit occurs by causing a pin-like member which is inserted in the unit via a recess in the support and which may form part of a camera to engage with teeth forming part of the body and then to move it in a direction parallel to the longitudinal direction of the support. The distance over which the pin is moved corresponds to the pitch of the teeth, which pitch has been chosen to be so that upon moving said body over said distance each time one striker spring is unlocked and hence also each time one flash lamp is fired.

During operation of such a flash lamp unit, the pin-shaped member must make the following movements. First the member is caused to engage with the teeth by means of a stapping movement, then it is moved in the lateral direction so that a flash lamp is fired, after which the pin-shaped member is withdrawn and finally returned to its initial position by means of a movement in the opposite lateral direction. Of course, such a pattern of movement requires extra means in the camera of which the pin-shaped member forms part.

However, cameras are known having a pin-shaped member emerging from the upper face of the camera and capable of performing a stabbing movement which is coupled to the movement of the shutter mechanism of the camera, which stabbing movement is directed mainly transversely to the upper face of the camera. Said stabbing movement need not necessarily be rectilinear. As a matter of fact, when the pin-shaped member is connected to the end of a pivotable arm, a circular movement is described by the member. Such a camera can cooperate with a flash lamp unit constructed as a flash cube and comprising four flash lamps to be fired by a stroke. Said stroke is delivered by a pre-energized spring which is unlocked by the pin-shaped member.

It is an object of the invention to provide a flash lamp unit of the type to which the invention relates, which flash lamp unit comprises means enabling said unit to be operated with a camera which has a pin-shaped member which upon actuating the camera performs the above-mentioned stabbing movement.

For that purpose, the flash lamp unit of the type mentioned in the preamble is characterized in that in behalf of the movement of the body at least one energized transport spring is present in the unit which permanently exerts a force on the body acting in the direction of movement of the body. Enough potential energy should be stored in said transport spring to cause the body to move over a small distance a number of times which corresponds to the number of the flash lamps.

According to a first favourable embodiment of the flash lamp unit according to the invention, the transport spring is formed as a spring which is bent in a plane extending parallel to the longitudinal direction of the support. In this case, said transport spring is secured to the movable body with its one end and to the support with its other end.

According to a second favourable embodiment of the flash lamp unit according to the invention, the transport spring is formed by at least one of the striker springs. The energy required for moving the body is obtained in that the pre-energized striker springs are released stepwise. At least one striker spring is unlocked in each step, which striker spring causes a flash lamp to ignite.

A favourable embodiment of the last-mentioned flash lamp unit is characterized in that the projections on the movable body each have an edge which extends at least substantially transversely to the longitudinal direction of the body and against which the striker springs bear, the support having a number of ramps which are present beside the body and by means of which each time one striker spring is lifted over the projection on the movable body in the case of a step-wise movement of the body.

Another embodiment of the flash lamp unit is characterized in that each of the striker springs bears against the edge of the body extending at least substantially transversely to the longitudinal direction of the body, the distance from the free end of the arm to the edge being different for all the springs and each time decreasing in the case of step-wise movement of the body so that each tme one striker spring is unlocked. In the step-wise movement of the body, the free end of each striker spring approaches the edge of the projection more and more closely until said free end passes the edge and hence is unlocked.

The holding means present in the flash lamp unit serve to lock the movable member in an assumed position. As a result of this it is prevented that the body can move relative to the support other than by the influence of the pin-shaped member of the camera. In the known flash lamp units said holding means are formed by a ball which is pressed against the body by a spring arranged in the support. The member has a number of semi-circular recesses which are positioned in the longitudinal direction of the body in such a manner that each time at the end of a sliding movement of the body the ball is pressed into one of the recesses.

In the flash lamp unit according to the invention, in which a force is exerted permanently on the body, the action of said known holding means is insufficient to prevent an undesired movement of the body.

For that purpose, a flash lamp unit of the above-described type of which the support has a recess via which the body is accessible for a member penetrating into the unit and in which the body has teeth is characterized according to the invention in that the holding means are formed by an escapement which is pivotably secured to the support and cooperates with the teeth of the body, which escapement can be moved by the member penetrating into the unit via the recess. The escapement comprises two pallets which can each be brought into engagement, but not simultaneously, with the teeth of the body by causing the escapement to tilt about its pivot. During each pivoting movement, the body moves due to the resilience of the transport spring over a distance which is equal to the pitch of the teeth.

The escapement preferably comprises an arm which extends in the longitudinal direction of the support and of which the end remote from the pivot is designed to cooperate with the member penetrating into the unit. Said arm serves as a lever by means of which the frictional forces occurring between the escapement and the teeth can be overcome.

A further favourable embodiment of the flash lamp unit according to the invention is characterized in that the body comprises means which are designed to cooperate with a part of the escapement and which are positioned so relative to the teeth that the part of the escapement designed to cooperate with the member penetrating into the unit assumes a position nearer to the body when all the lamps of the row have been fired than is the case when one or more lamps of the row are still unused. It is the object of said means to warn the photographer when all the flash lamps of the row have been fired. If actually the said part of the escapement, for example, the end part of the arm, assumes the position in which it is nearer to the body, the member of the camera penetrating into the unit will experience no resistance and can hence penetrate further into the unit than is the case when one or more unused flash lamps still occur in the row.

In known cameras, said larger depth of penetration of the pin-like member causes, via a transmission mechanism, a movement of a warning vane which becomes visible in the view finder of the camera. As a result of this, the photographer's attention is drawn to the fact that no flash lamp will be fired when he actuates the shutter mechanism of the camera.

Figure 2:
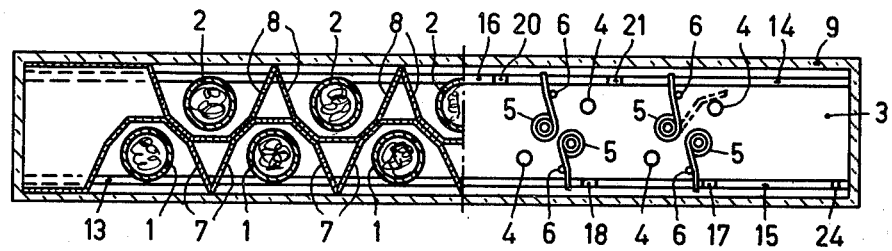
Figure 3:
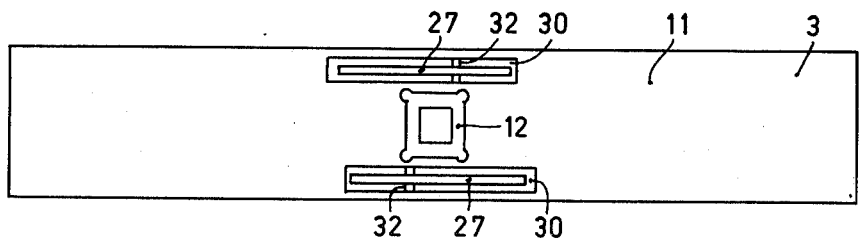
Figure 5:
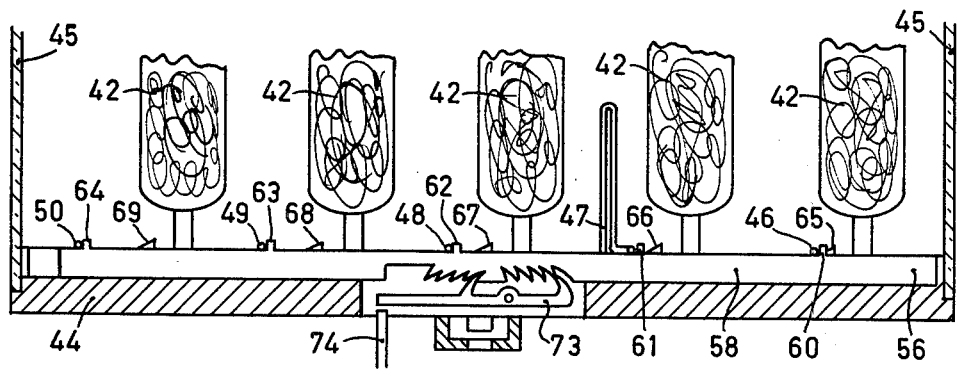
Figure 4:
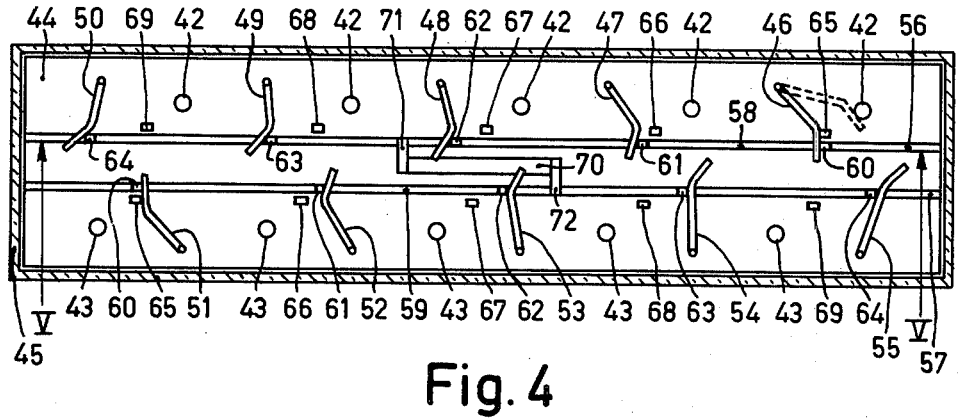
Figure 6:
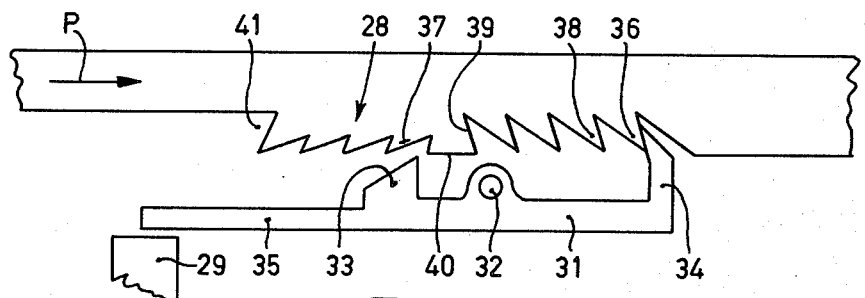
Figure 7:
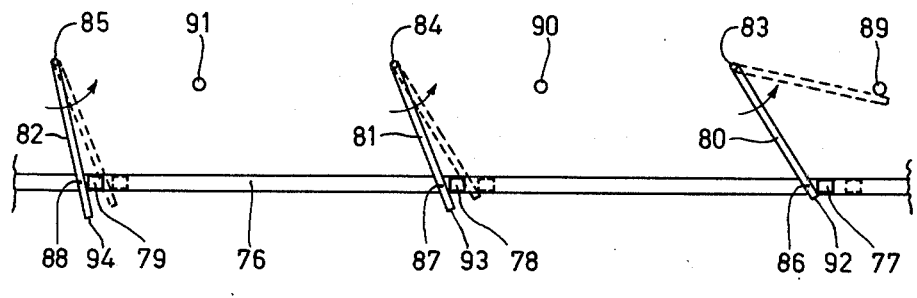

The invention will be described in greater detail with reference to the drawing, in which:

FIG. 1 is a sectional view of a first embodiement of the flash lamp unit according to the invention, FIG. 2 is a sectional view taken on the line II—II of FIG. 1, FIG. 3 is an underneath view of the flash lamp unit shown in FIG. 1, FIG. 4 is a sectional view of another flash lamp unit according to the invention, FIG. 5 is a sectional view taken on the line V—V of FIG. 4, FIG. 6 shows on an enlarged scale the escapment shown in the preceding figures and, FIG. 7 is a detail of a sectional view of still another embodiment of the flash lamp unit according to the invention.

The flash lamp unit shown in FIGS. 1, 2 and 3 comprises two rows of each five flash lamps 1 and 2 which are arranged on a common elongate support 3. Said flash lamps are of the type which can be fired by a stroke against a tubular lamp part 4. For performing such a stroke, one pre-energized locked striker spring 5 is present in the flash lamp unit for each flash lamp. In this embodiment each spring is formed as a helically wound piece of wire which is locked in the support with its one end and the other end of which is stretched. Said stretched end portions of the striker springs are locked by ramps 6 projecting from the plane of the support 3.

The flash lamps 1 and 2 cooperate with reflectors 7 and 8, respectively, arranged in a nested back-to-back relationship. In this embodiment, the reflectors 7 and 8 are each formed from one strip of reflecting material. The flash lamps and the reflectors are surrounded by a cover 9 of a transparent material, which cover 9 is connected to the support 3 with its edge 10. On its lower side 11 said support has a projection 12 by means of which the unit can be coupled to a camera. Recessed in the support are furthermore two slots 13 and 14 in which bodies 15 and 16, respectively, are arranged so as to be movable in the longitudinal direction of the support. Said bodies are formed as thin strips of material having on their upper side projections 17, 18, 19, 20 and 21 facing the flash lamps. Said projections have an inclined rising edge with which upon movement of the body in the direction of the slot an end portion of a striker spring is lifted until said end portion passes over the associated ramp and fires a lamp. FIG. 2 shows in broken lines the position which a striker spring assumes when the associated flash lamp has been fired. According to the invention, this movement of the body is caused by a transport spring 22 which exerts a permanent force on the body acting in the longitudinal direction of the support. As shown in FIG. 1, the transport spring is in the form of a leaf spring which is secured with its one end 23 in a recess 24 of the body 15 and with its other end 25 incorporated in a recess 26 in the support. Of course, one transport spring 22 is present for each of the bodies 15 and 16.

For the successive ignition of the flash lamps of one row the body should be moved step-wise. This is carried out by means of an escapement 27 which cooperates with teeth 28 which form part of the body and which can be actuated by a pin-shaped member 29. Said pin-shaped member possibly forms part of a camera and is coupled to the shutter mechanism of said camera via a transmission mechanism in such manner that upon actuation of the shutter mechanism a stabbing movement is carried out by the pin-shaped member. In this stabbing movement, which may be rectilinear or circular, the pin-shaped member penetrates into the unit via a recess 30 in the support when the flash lamp unit is coupled to the camera.

The operation of the escapement is explained with reference to FIG. 6. The escapement is formed by a central beam 31 which is pivotably connected to the support 3 by means of a shaft 32. The ends of the beam 31 comprise pallets 33 and 34 which can cooperate with the teeth 28. In this embodiment, the escapement furthermore comprises an arm 35 which serves as a lever and of which the free end remote from the pivot shaft is designed to cooperate with the pin-shaped member 29. As stated above, a permanent force is exerted on the body by a transport spring, which force is denoted by the arrow P. In the position shown in FIG. 6 the tooth 36 bears against pallet 34. When as a result of the action of the pin 29 penetrating into the unit the beam 31 is rotated clockwise, the pallet 34 moves downwards and releases tooth 36. Due to the action of the force P the body then moves to the right. The upwardly moved pallet 33 touches tooth 37. When the body moves further, pallet 33 is again pressed down by tooth 37 so that the beam 31 rotates counterclockwise and tooth 38 is pressed against pallet 34. The body has then been moved one step so that one striker spring is unlocked. This operation can be repeated five times, each time one flash lamp being fired. When the fifth and last flash lamp is fired, the pallet 34 releases tooth 39. When the body then moves to the right, pallet 34 will not engage a subsequent tooth but will bear with its tip against the edge 40. Pallet 33 penetrates into recess 41. With respect to the position shown, the escapement then assumes a position rotated clockwise. As a result of this, the end portion of the arm 35 designed to cooperate with the pin-shaped member 29 assumes a position nearer to the body than is the case when one or more lamps of the row are still unused. The photgrapher will now be warned in the above-described manner that all the lamps of the row have been fired.

FIGS. 4 and 5 show another embodiment of the flash lamp unit according to the invention. This unit comprises two rows of each five combustion flash lamps 42 and 43. Only the tubular parts of the flash lamps are shown in FIG. 4. The flash lamps, totaling ten in number, are arranged with the associated reflectors, not shown, on a common elongate support 44 and are covered by a transparent cover 45 connected to the edge of the support. The flash lamps can be fired by giving a stroke against the tubular lamp parts. For that purpose, striker springs 46, 47, 48, 49 and 50, totaling 10 in number, for the lamps 42 and 51, 52, 53, 54 and 55 for the lamps 43 are present. In this embodiment the said striker springs are each constructed as a piece of wire which is bent in the form of a hair pin and which is fixed in the support with its one end and of which the other end which is designed to give a stroke against the tubular lamp part is locked. The support has two slots 56 and 57 which extend in its longitudinal direction and in which movable bodies 58 and 59, respectively, are arranged. The bodies 58 and 59 each comprise a row of projections 60 to 64 each having an edge extending transversely to the longitudinal direction of the body and against which a striker spring rests. Ramps 65 to 69 are present on the support 44 beside the slots 56 and 57. According to this embodiment, the support 44 furthermore comprises a leaf spring 70 whose ends have laterally projecting parts 71 and 72 which press the movable bodies 58 and 59 in the slote 56 and 57.

In this embodiment also, the step-wise movement of the bodies 58 and 59 is controlled by means of escapements 73 which can be actuated by a pin-shaped member 74 penetrating into the unit. For the operation of said escapements, reference is made to the above explanation with reference to FIG. 6 of the drawing. The force required for moving the bodies is supplied by the striker springs. When the escapement 73 which belongs, for example, to body 58 is actuated, the body 58 will move to the right by one step (in FIGS. 4 and 5) due to the resilience of the striker springs 46 to 50. During the first step-wise movement, spring 46 is lifted over the projection 60 by the ramp 65 and is thus unlocked. Striker spring 46 will then cause the associated flash lamp 42 to be fired. The position which the striker spring 46 assumes when the associated flash lamp 42 has been fired is shown in broken lines in FIG. 4. During the next step-wise movement of the body 58 the striker spring 47 is unlocked. This may be repeated five times after which the flash lamp unit can be uncoupled from the camera, rotated through 180° and be connected again to the camera so that the escapement which cooperates with the body 59 can be actuated by the pin-shaped member 74 to fire the lamps 43.

The detail of a sectional view of another embodiment of the flash lamp unit according to the invention is shown in FIG. 7. A slot in which a movable body 76 having projections 77, 78 and 79 is incorporated is recessed in a support (not shown). Said projections have the same shape as the projections 60 to 64 on the bodies 58 and 59 in FIGS. 4 and 5 and thus have an edge extending transversely to the longitudinal direction of the body 76. The unit furthermore comprises a number of striker springs 80, 81 and 82 which are fixed in the support (not shown) at their end parts 83, 84 and 85, respectively, and of which the end parts 86, 87 and 88 bear against the edges of the projections 77, 78 and 79. The striker springs 80, 81 and 82 are locked in the pre-energized condition and exert with their end portions 86, 87 and 88 a force on the body of which a component is operative in the longitudinal direction of the body. The unit furthermore comprises flash lamps 89, 90 and 91, respectively, which are provided on the support (not shown) and which can be fired by a stroke of the striker springs. Instead of the projections shown in FIG. 7, the body may also comprise a number of apertures through which the end parts of the striker springs are threaded.

The sequential unlocking of the striker springs occurs by the step-wise movement of the body 76. This step-wise movement can be controlled by means of, for example, an escapement. As shown in the figure, the distances from the free ends 92, 93 and 94 of the striker springs to the edges of the projections 77, 78 and 79 are unequal. When the body 76 is moved over a small distance corresponding to one step the free end 92 of the striker spring 80 is released from the edge of the projection 77 and is thus unlocked. Said striker spring 80 will then give a stroke against a part of the lamp 89 and will fire it. The resulting position of the striker spring and the body is denoted in broken lines. It appears that in a subsequent step-wise movement of the body 76, the striker spring 81 is unlocked.

In the above description, flash lamp units were described which comprise two rows of five flash lamps each. Of course, the invention may also be used suitably in a flash lamp unit which has only one row with a number of flash lamps differing from five. Furthermore, of course, there is no restriction as to the choice of the type of striker springs; for example, the striker spring having a coiled shaped may be used in the flash lamp unit shown in FIGS. 4 and 5, while striker springs having a hairpin configuration are also suitable for a flash lamp unit shown in FIGS. 1, 2 and 3.

What is claimed is:

1. A flash lamp unit having a plurality of percussion flash lamps which ignite responsive to impact disposed in at least one row, a common elongate support carrying said one row of lamps, a plurality of striker springs, each of said springs being disposed proximate to a different one of said plurality of lamps, means for holding each spring in a prestressed form and selectively releasing each spring individually, each spring impacting said proximate lamp when selectively released to ignite said proximate lamp, an elongate body cooperating with said support, said body being movable in the longitudinal direction with respect to said support, said body having a plurality of projections disposed in spaced relationship, each of said projections cooperating with said springs and sequentially releasing said springs from a prestressed form upon incremental movement of said body in the longitudinal direction, escapement means to selectively hold said body in a plurality of discreet longitudinal positions and biasing means for urging said body in said longitudinal direction comprising one or more of said striker springs.

2. A flash lamp unit as claimed in claim 1 wherein said projections on said movable body each comprise a surface extending generally transverse to the longitudinal direction of said body, said striker springs each bearing on one of said surfaces of said projections in at least one position of said movable body, said support comprising a pluarality of ramps, each ramp being disposed proximate to one of said striker springs, each striker spring having an extension, said extension of said springs being sequentially lifted over the cooperating projections on the movable body upon incremental movement of said body.

3. A flash lamp unit as claimed in claim 2 wherein the distance from one end of said extension to said surface on which said extension bears in at least one position of said movable body is different for each spring and is reduced upon incremental movement of said movable body.

* * * * *

UNITED STATES PATENT AND TRADEMARK OFFICE
CERTIFICATE OF CORRECTION

PATENT NO. : 3980421
DATED : September 14, 1976
INVENTOR(S) : ANDREAS MARIA HEEMAN ET AL It is certified that error appears in the above-identified patent and that said Letters Patent are hereby corrected as shown below:

Column 1, line 34, "stapping" should be --stabbing--.

Column 2, line 35, "tme" should be --time--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*